No. 874,340. PATENTED DEC. 17, 1907.
F. C. HOOD.
RUBBER OVERSHOE.
APPLICATION FILED NOV. 10, 1906.
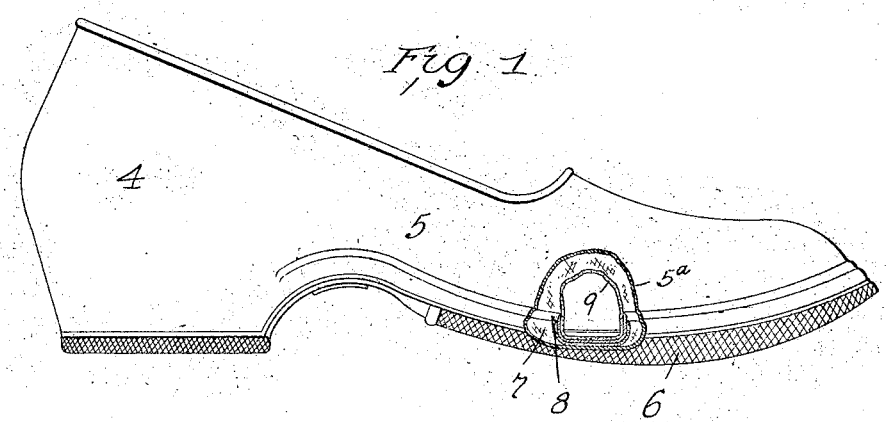
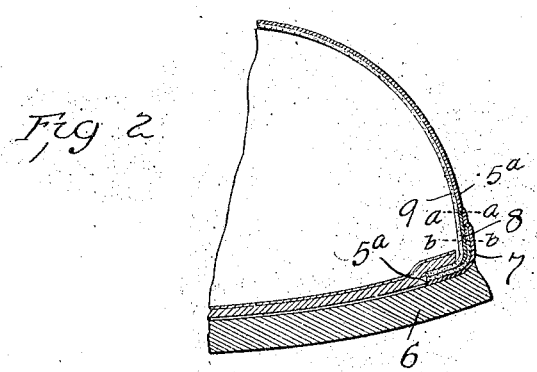
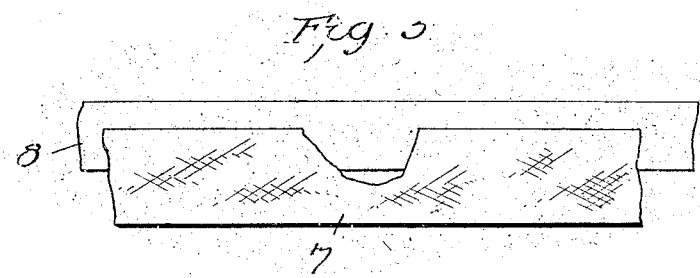
Inventor
Frederic C. Hood.
Attest:
Edward N. Sartow
C. S. Mason

UNITED STATES PATENT OFFICE.

FREDERIC C. HOOD, OF BOSTON, MASSACHUSETTS.

RUBBER OVERSHOE.

No. 874,340.     Specification of Letters Patent.     Patented Dec. 17, 1907.

Application filed November 10, 1906. Serial No. 342,883.

*To all whom it may concern:*

Be it known that I, FREDERIC C. HOOD, citizen of the United States, residing at Boston, Massachusetts, have invented certain new and useful Improvements in Rubber Overshoes, of which the following is a specification.

My invention relates to improvements in rubber overshoes, and particularly to overshoes having an elastic upper.

The object of the invention is to prevent liability of the shoe breaking along the edge where the upper joins the sole; or, when shoes are made with a rigid frictioned strip called "piping", of the upper cracking along the edge of the strip, or in other words where the elastic part joins the rigid part.

The invention includes the particular construction hereinafter described and particularly pointed out in the appended claims.

An overshoe embodying the invention is illustrated in the accompanying drawing in which,—

Figure 1 is a view of a complete overshoe, partly broken away. Fig. 2 is an enlarged partial cross section, and Fig. 3 is a detail view of the reinforcing strip.

In this drawing the numeral 4 designates an overshoe which is representative of any ordinary or desired style of shoe.

The upper is indicated by the numeral 5 and the sole by the numeral 6. In overshoes as ordinarily made, they frequently break or crack at or near the junction of the sole and upper or when a piece known as "piping" is used they crack at the junction of the edge of the piping and the upper, and in order to prevent the breaking or cracking at these points, and to make a secure junction between the upper and sole, I provide a strip of bias cut fabric (7) which has been "frictioned" and which has a strip of rubber (8) extending beyond one edge.

The rubber strip as shown extends over a portion only of the surface of the fabric and projects beyond the edge so that one edge of the strip has a frictioned fabric only, while the other edge is of rubber only, and intermediate of these is a composite portion of rubber and frictioned fabric, rubber on one side and frictioned fabric on the other. This reinforcing strip is applied with the rubber side (8) next to the lining 9 of the shoe and with the frictioned fabric edge (7) extending down underneath the insole. By this arrangement I secure at the edge of the sole or corner of the shoe an alternate arrangement of rubber and frictioned fabric which gives a very firm union; while just above the edge of the strip, due to the extension of the rubber (8) I secure a thickened rubber portion as indicated between the lines $a$—$a$ and $b$—$b$. The bias cut frictioned fabric transfers the strain in a gradually reduced manner from the edge of the sole to the point indicated by dotted lines $b$—$b$ and the rubber extension (8) transfers it again to the point $a$—$a$ and both the rubber extension (8) and the frictioned fabric (7) are put on in such a manner that a much firmer connection is secured and all danger of cracking along the lines of junction is avoided through the thorough distribution of the strain.

Having thus described my invention what I claim is:—

1. In a rubber overshoe the combination with the upper and sole of a reinforcing strip at the junction thereof comprising a bias strip of frictioned fabric having one edge provided with a facing of rubber said rubber being extended beyond the edge substantially as described.

2. In a rubber overshoe the combination with the elastic upper and the sole; of a reinforcing strip located at the junction of the upper and sole, said reinforcing strip comprising a layer of fabric and a layer of rubber, the rubber projecting above the upper edge of the fabric and secured to the upper, and the fabric extending below the lower edge of the rubber and engaging the sole.

In testimony whereof, I affix my signature in presence of two witnesses.

FREDERIC C. HOOD.

Witnesses:
EVELYN LEAVITT,
MARTIN A. WATERS.